3,749,774
SECRETIN PREPARATION HAVING PROLONGED ACTION AND THE PROCEDURE OF MANUFACTURE
Rudolf Schleyerbach, Hofheim, Taunus, and Rolf Geiger, Frankfurt am Main, Germany, assignors to Farbwerke Hoechst Aktiengesellschaft vormals Meister Lucius & Bruning, Frankfurt am Main, Germany
No Drawing. Filed Jan. 27, 1972, Ser. No. 221,414
Claims priority, application Germany, Jan. 30, 1971, P 21 04 344.7
Int. Cl. A61k 27/00
U.S. Cl. 424—177
2 Claims

ABSTRACT OF THE DISCLOSURE

Secretin preparation having prolonged action which comprises a content of (a) secretin
(b) an aqueous solution of gelatin-derivative cross-linked with hexamethylene-diisocyanate and
(c) polyphloretin phosphate and a process for the manufacture thereof.

---

The present invention relates to a secretin preparation having a prolonged action and the method for manufacturing said preparation.

This secretin derivative having prolonged action is obtained by combining (a) an aqueous solution of secretin,
(b) the aqueous solution of a gelatin derivative cross-linked with hexamethylene-diisocyanate, prepared according to German Pats. Nos. 1,118,792 or 1,155,134 (hereinafter referred to as "gelatin derivative"), and
(c) the aqueous solution of polyphloretin phosphate, and optionally lyophilising the solution thus obtained.

The secretin can be obtained from natural sources or can be prepared synthetically. The gelatin derivative used in accordance with the invention is a partially degraded gelatin cross-linked with hexamethylene-diisocyanate. It is prepared according to German Pat. No. 1,118,792 or No. 1,155,134 or to the corresponding U.S. Pat. No. 3,057,782.

The manufacture of polyphloretin phosphate is described in German Pat. No. 929,664.

To manufacture the depot preparations the individual components are, for example, separately dissolved in water, the acid solution of polyphloretin phosphate being neutralized with an inorganic base, such as potassium hydroxide, sodium hydroxide or ammonia, or with an organic base, for example, a tertiary amine, such as triethyl amine or N-ethyl-piperidine. First the solutions of secretin and gelatin derivative are combined and then the solution of polyphloretin phosphate is added. The solution is adjusted to isotonicity with sodium chloride or a physiologically acceptable organic compound, for example an amino acid, such as sodium glutamate and the pH is then adjusted to the range between 5.5 to 7.5, preferably at 6.5 to 7.2. The solution is sterilized by filtration, pipetted into sterile bottles and optionally lyophilised.

The ratio of the individual components may be varied within determined limits. Generally, polyphloretin phosphate and gelatin derivative are used in excess. Advantageously, from 15 to 30 mg. of polyphloretin phosphate and from 20 to 80 mg. of gelatin derivative are used per approximately 75 clinical units (definition according to Jorpes and Mutt, Acta physiol. Scand., vol. 66 (1966), pp. 316–325) of secretin. To determine the prolonged action of secretin the pancreatic juice flow was measured on the dog.

Fasted dogs, weighing from 12 to 20 kg. were intravenously anesthetized with pentobarbital. The pancreatic ductus was opened between the pancreas and duodenum, a polyethylene tube was introduced into the lumen of the excretory duct so that the pancreatic juice could be obtained in pure state and the volume of secretion could be registered continuously. In order to avoid endogenous hormone releases via the gastric juice and the bile secretion, the pylorus was ligated, the ductus choledochus was tied off and the bile led off. Optionally, accessory pancreatic ducts were tied off. The animals were given a continuous intravenous infusion of about 10 ml./h. of physiological sodium chloride. Secretin was administered intravenously in the femoral vein via catheters of synthetic material, subcutaneously at the side of the thorax and intramuscularly in the glutual muscles. The secretin used was pure natural secretin (Gastrointestinal Hormon-Research Unit, Chem. Abt. Karolinska Institutet, Stockholm, Batch No. 17041). For the depot tests the secretin dosage was always 75 units per dog dissolved in 1 ml. of physiological sodium chloride or in the corresponding depot carrier. The following depot preparations have been tested:

30 mg./ml. of polyphloretin phosphate (PPP)
15 mg./ml. of PPP+20 mg./ml. of gelatine derivative
30 mg./ml. of PPP+40 mg./ml. of gelatine derivative
30 mg./ml. of PPP+80 mg./ml. of gelatine derivative All solutions were adjusted at pH 6.8 and prepared on the test day, immediately before the application. Three injections per dog were given, always in the same order:

(1) Secretin dissolved in a 0.9% sodium chloride solution
(2) Secretin dissolved in the depot carrier
(3) Secretin dissolved in a 0.9% sodium chloride solution.

The volume of the secreted pancreatic juice was measured in 15 minute intervals. Since dogs are carnivorous animals, and have almost no basal pancreatic secretion, the end of the secretin action could be exactly evaluated by means of a pancreatic juice flow diagram and the period of activity could be calculated.

As shown in Table I, the depot preparations in accordance with the invention provide a considerable prolongation of the secretin effect. This secretin preparation, in accordance with the present invention, is a valuable medicament. It may be used for diminishing the gastric secretion in the case of ulcer diseases and for the stimulation of pancreatic juice secretion.

TABLE I
Pancreatic juice flow after subcutaneous secretin injection

| Depotpreparation | Period of activity | | | Depot effect Percent prolongation of the period of activity |
|---|---|---|---|---|
| | 1. Injection Normal-secretin | 2. Injection "Depot-secretin" | 3. Injection Normal-secretin | |
| 15 mg./ml. of PPP plus 20 mg./ml. of gelatine-derivative | 3 hr. 45 min. | 5 hr. 15 min. | 3 hr. | 56 |
| 30 mg./ml. of PPP plus 40 mg./ml. of gelatine-derivative | 3 hr. 45 min. | 7 hr. 15 min. | 3 hr. 30 min. | 100 |
| 30 mg./ml. of PPP plus 80 mg./ml. of gelatine-derivative | 2 hr. 45 min. | 9 hr. 45 min. | 2 hr. 30 min. | 271 |

NOTE.—PPP=Polyphloretinphosphate.

We claim:
1. Secretin injectable dosage unit preparation having prolonged action which comprises a content of
   (a) secretin, in clinically effective dosage amount, in a depot carrier of
   (b) an aqueous solution of gelatin derivative cross-linked, with hexamethylene-diisocyanate and
   (c) polyphloretin phosphate.
2. Secretin preparation having prolonged action as claimed in claim 1, which has a content of
   (a) 75 clinical units of secretin
   (b) 20–80 mg. of gelatin derivative cross-linked with hexamethylene diisocyanate
   (c) 15–30 mg. of polyphloretin phosphate.

References Cited
UNITED STATES PATENTS

| | | | |
|---|---|---|---|
| 2,962,515 | 11/1960 | Diczfalusy et al. | 260—920 |
| 3,057,782 | 10/1962 | Lindner et al. | 424—177 |
| 3,192,114 | 6/1965 | Hogberg et al. | 424—177 X |
| 3,322,632 | 5/1967 | Schwick et al. | 424—360 X |
| 3,326,764 | 6/1967 | Jorpes et al. | 424—177 |
| 3,329,574 | 7/1967 | Barron et al. | 424—177 X |
| 3,574,820 | 4/1971 | Johnson et al. | 424—360 X |
| 3,639,383 | 2/1972 | Geller | 424—177 X |

FOREIGN PATENTS

| | | |
|---|---|---|
| 778,142 | 7/1957 | Great Britain. |

OTHER REFERENCES

Graumann et al.: Acta Histochem. 6: 254–262 (1959).
Hedner: Acta Endocrinol 43(4): 599–509 (1963).
Colldahl: Acta Endocrinol 47(4): 565–573 (1964).

SHEP K. ROSE, Primary Examiner

U.S. Cl. X.R.

424—360